(No Model.)

W. M. TEGART.
CARRIER FOR BICYCLES, &c.

No. 606,367.  Patented June 28, 1898.

WITNESS
John Buckler,
L. M. Muller

INVENTOR
William M. Tegart,
BY
Edgar Tate & Co.
ATTORNEYS

United States Patent Office.

WILLIAM MONTGOMERY TEGART, OF YORKTON, CANADA.

CARRIER FOR BICYCLES, &c.

SPECIFICATION forming part of Letters Patent No. 606,367, dated June 28, 1898.

Application filed November 18, 1897. Serial No. 659,057. (No model.)

*To all whom it may concern:*

Be it known that I, WILLIAM MONTGOMERY TEGART, a subject of the Queen of Great Britain, residing at Yorkton, in the Province of Assiniboia, Northwest Territory, Dominion of Canada, have invented certain new and useful Improvements in Carriers for Bicycles and Similar Vehicles, of which the following is a full and complete specification, such as will enable those skilled in the art to which it appertains to make and use the same.

This invention relates to package-carriers for bicycles and similar vehicles; and the object thereof is to provide an improved device of this class which is adapted to be detachably connected with the frame of a bicycle or similar vehicle, and preferably to the forward upright tubular head thereof, and which is designed to support or receive a camera, various articles of baggage, and other articles of any kind or class.

The invention is an improvement on that described and claimed in Patent No. 593,443, issued to me by the United States Patent Office on the 9th day of November, 1897, and is fully disclosed in the following specification, of which the accompanying drawings form a part, in which—

Figure 1:
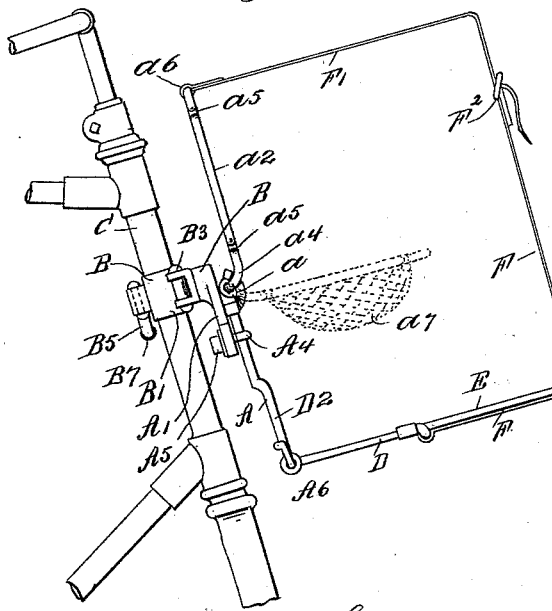
Figure 2:
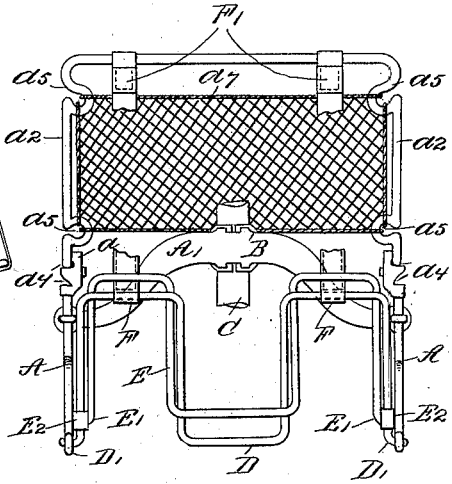
Figure 3:
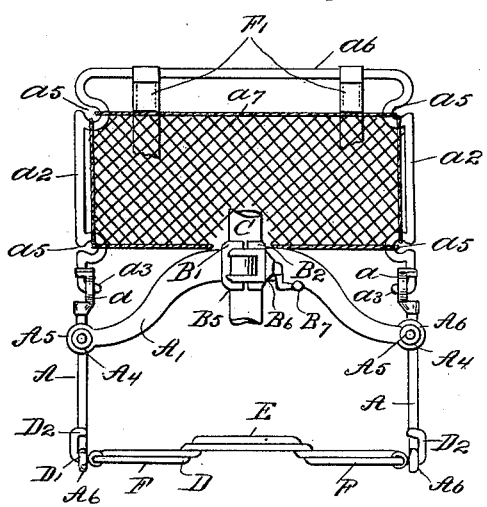
Figure 4:
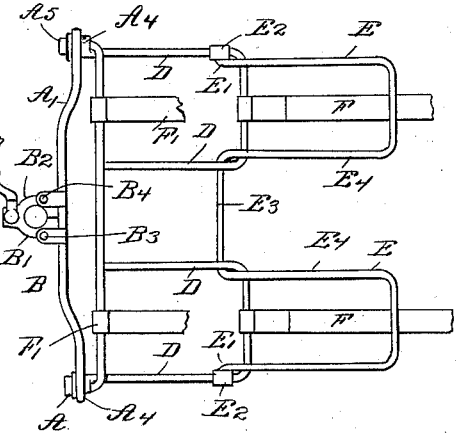

Figure 1 is a side elevation of a part of a bicycle, showing my improved carrier connected therewith; Fig. 2, a front view of the same with parts thereof folded up; Fig. 3, a rear elevation of the device as shown in Fig. 1, and Fig. 4 a plan view thereof.

In the drawings forming part of this specification the separate parts of my invention are designated by letters of reference in each of the views, and in said drawings I have shown at C the upright tubular head of the frame of the bicycle, through which the stem of the forward fork passes, and in the practice of my invention I provide a carrier for the purpose herein specified, which consists of main back rods A, which are connected by a cross head or bar $A'$, which is provided centrally with a clamp B for fastening the carrier to the tubular head C of the bicycle or similar vehicle.

At the lower end of the main back rods A is hinged a forwardly-extending bottom D, adapted to receive and support a camera, articles of baggage, or other articles, and this bottom or bracket D is provided with an extension E, adapted to be moved outwardly or inwardly, and also to be swung upwardly at right angles to the bottom and parallel with the back rods A and the cross-head $A'$.

The upper ends of the back rods A are provided with semicircular heads $a$, and I also provide supplemental back rods $a^2$, which are provided at their lower ends with backwardly and transversely bent hooks $a^3$, which are adapted to pass through corresponding holes formed in the semicircular heads $a$ of the main back rods A, and said semicircular heads $a$ are provided in their outer sides with notches or recesses $a^4$, any desired number of which may be employed, and the supplemental back rods $a^2$ are provided adjacent to their upper and lower ends with inwardly-directed loops $a^5$, which are connected by a top rod $a^6$, and connected with the loops $a^5$ is a flexible network $a^7$, which is adapted to serve as a basket or holder for small articles, and the supplemental back rods $a^2$ and the top rod $a^6$ constitute a supplemental back frame which is adapted to be folded forwardly, as shown in dotted lines in Fig. 1, this operation being made possible by means of the notches or recesses $a^4$ in the semicircular heads $a$ of the back rods A of the main frame and the pivotal connections between said parts.

In order to securely hold a camera, package, or other article in place on the main carrier, I provide the outer ends of the bottom D with straps F, and similar straps $F'$ are connected with the top cross-rod $a^6$ of the supplemental folding frame, and these straps, after passing around part of the under side, the front, and top of the camera or other article, are connected by suitable buckles $F^2$, as indicated in Fig. 1.

The main back rods A are preferably slightly curved inwardly and downwardly, as shown in Fig. 1, and the cross head or bar $A'$ is connected therewith by eyebolts $A^4$, extending through the outer ends of said crossbar $A'$, and said bolts are provided with nuts $A^5$, and by loosening the nuts $A^5$ the eyebolts $A^4$ may be moved up and down on the upper ends of the main back rods A, so as to permit of the vertical adjustment of the carrier.

The clamp B is preferably composed of two halves B' and B², connected by hinges B³ and B⁴, respectively, with the cross-bar A', at or near the middle thereof, as shown in Figs. 3 and 4, and the free end of the half B' of said clamp is provided with a hinged loop B⁵, which is adapted to engage a lug B⁶, projecting from the free end of the other half B² of said clamp.

In the loop B⁵ is placed a handled screw B⁷, adapted to engage the lug B⁶, so as to securely lock the loop to the lug and keep the halves B' and B² firmly pressed in contact with the steering-head C, so as to securely support the carrier.

It is evident that by giving a turn to the handle-screw B⁷ the loop B⁵ can be moved out of engagement with the leg B⁶, and the two halves B' and B² of the clamp can be opened, so as to detach the clamp from the head C of the frame of the vehicle, and thus the entire carrier can be readily detached from said head, and by closing the halves B' and B² upon the steering-head and drawing the loop B⁵ over the lug B⁶, I am enabled to readily fasten the clamp, and consequently the entire carrier, to the head, and the parts B' and B² of said clamp are preferably lined with a suitable material to prevent marring or scratching the enamel on the head C.

The hinge for the bottom D at the lower end of the main back rods A is formed by passing the transverse ends D' of said bottom through eyes A⁶, formed in the lower ends of the back rods A, and said transverse ends are bent upwardly to form hooks D², adapted to engage with the sides of the said back rods A and hold the bottom D approximately at right angles to the back rods or in a projected position, so as to support a camera or other package or article, as previously mentioned.

The bottom D is composed of wire, as clearly shown in Fig. 4, and the extension E is adapted to slide thereon and is preferably made in the shape of the frame, as shown in Fig. 4, with the free ends of the frame provided with transverse pivots E', which engage slides E², fitting to slide on the outer side of the bottom D, and the middle portion of the extension E extends under the middle bars of the bottom D, and the arms E⁴ of said extension then pass over the front ends of the bottom D to properly support the extension E in a horizontal position upon the bottom D.

It will be seen by the arrangement described that the bottom D can be swung up against the back rods A and the cross-head A', by which they are connected when said bottom is not in use, and the extension E can be drawn out or pushed in and swung upward, according to the size of the article to be carried, and be out of the way when the device is in use, and it will thus be seen that the entire device is rigidly supported from the head C of the frame of the vehicle and is consequently not in the way of the handle-bar or the forward fork of the front wheel, so that the bicycle can be manipulated in the usual manner without interfering with the attachment. As the load is supported directly above the front wheel, it is evident that the load does not act as a drag on the machine or hinder the proper movements of the operator when propelling the vehicle.

It will also be seen from an examination of Figs. 1, 2, and 3 that the cross-bar or cross-head A' is curved downwardly at its ends, so that the points of the attachment of the carrier at A⁴ are lower than the clamp B, thereby securing a steadier support of the load and relieving the clamp of the strain, and when constructed in this manner the cross-bar or cross-head A' also serves as a stop or rest for the extension E and the bottom D when folded up, as shown in Fig. 2.

When it is desired to carry a large article, it will be understood that the supplemental frame, consisting of the rods $a^2$, the cross-rod $a^6$, by which they are connected, and also the netting $a^7$, may be raised into the position shown in Fig. 1 and locked therein by reason of the notches or recesses $a^4$, and when it is desired to carry only a small package or article the said supplemental frame may be lowered into the position shown in dotted lines in Fig. 1, in which event the extension E of the bottom D may be moved back and said bottom fall upwardly, and the straps F and F' may also be used, if desired, or not, as may be necessary.

My improvement is simple in construction and operation and is perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A carrier for bicycles and similar vehicles which is adapted to be connected with the forward upright tubular head of the frame, said carrier consisting of a cross head or bar provided with a clamp which is adapted to be connected to said tubular head, rods connected with the ends of said cross-head, and adjustable vertically thereon, a bottom frame hinged to, or pivotally connected with the lower ends of said rods, a sliding extension connected with said bottom frame, a supplemental frame hinged to or pivotally connected with the upper ends of said main rods, and adapted to be held in an upright, or lowered into a horizontal position, said supplemental frame being provided with a network which is adapted to form a basket, and said supplemental frame, and the extension of the bottom being provided with straps, substantially as shown and described.

2. A carrier for bicycles and similar vehicles, consisting of a cross head or bar which is adapted to be clamped to the forward part of the frame of the vehicle, said cross head or bar being provided at each end with main rods which are connected therewith, and to the lower end of which is hinged or pivoted a bottom frame which is adapted to be held in a forwardly-directed position, or to be folded upwardly a supplemental frame pivotally connected with the upper ends of said main rods and adapted to be held in a forwardly-directed position or in an upright position, said supplemental frame being provided with a network which is adapted to serve as a basket, and said bottom and said supplemental frame being provided with straps, substantially as shown and described.

3. A carrier for bicycles and similar vehicles, which is adapted to be connected with the forward part of the frame thereof, said carrier consisting of a cross head or bar, the ends of which are curved downwardly and provided with vertically-adjustable rods, a bottom frame hinged to the lower ends of said vertically-adjustable rods, and adapted to be held in a forwardly-directed position, or to be folded into an upright position, said bottom being provided with an extension which is adjustable thereon, and a supplemental frame pivotally connected with or hinged to the upper ends of said rods, and adapted to be held in a forwardly-directed position or in an upright position, and said supplemental frame and the extension of the bottom being provided with straps, substantially as shown and described.

4. A carrier for bicycles and similar vehicles, which is adapted to be connected with the forward part of the frame thereof, said carrier consisting of a cross head or bar, the ends of which are curved downwardly and provided with vertically-adjustable rods, a bottom frame hinged to the lower ends of said vertically-adjustable rods, and adapted to be held in a forwardly-directed position, said bottom being provided with an extension which is adjustable thereon, and a supplemental frame hinged to the upper ends of said rods, and adapted to be held in a forwardly-directed position, or in an upright position, and said supplemental frame and the extension of the bottom being provided with straps, and said supplemental frame being also provided with a network which is adapted to serve as a basket, substantially as shown and described.

In testimony that I claim the foregoing as my invention I have signed my name, in presence of the subscribing witnesses, this 8th day of November, 1897.

WILLIAM MONTGOMERY TEGART.

Witnesses:
   DOUGLAS H. COLE,
   ABRAHAM BELL.